United States Patent
Cha (10) Patent No.: US 7,280,605 B2
(45) Date of Patent: Oct. 9, 2007

(54) ORTHOGONAL FREQUENCY DIVISION MULTIPLEXING (OFDM) RECEIVER USED IN WIRELESS LOCAL AREA NETWORK SYSTEM AND SYMBOL TIMING SYNCHRONIZATION METHOD THEREFOR

(75) Inventor: Chi-ho Cha, Suwon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 714 days.

(21) Appl. No.: 10/802,053

(22) Filed: Mar. 17, 2004

(65) Prior Publication Data

US 2004/0223554 A1    Nov. 11, 2004

(30) Foreign Application Priority Data

Mar. 17, 2003    (KR) .................... 10-2003-0016490

(51) Int. Cl.
*H04K 1/10*    (2006.01)
(52) U.S. Cl. ..................................... 375/260
(58) Field of Classification Search ............... 375/260, 375/368, 369, 147–153
See application file for complete search history.

(56) References Cited

U.S. PATENT DOCUMENTS 6,724,834 B2* 4/2004 Garrett et al. .............. 375/317
7,006,587 B1* 2/2006 Lewis et al. ................ 375/365
2004/0076246 A1* 4/2004 Vanderperren et al. ..... 375/343

FOREIGN PATENT DOCUMENTS

EP    1 126 673 A2    8/2001

OTHER PUBLICATIONS

Kobayashi, H., A novel symbol frame and carrier frequency synchronization for burst mode OFDM signal, Vehicular Technology Conference, 2000, IEEE VTS-Fall VTC, Sep. 24, 2000-Sep. 28, 2000, pp. 1392-1396, vol. 3.

* cited by examiner

*Primary Examiner*—Chieh M. Fan
*Assistant Examiner*—Jason M. Perilla
(74) *Attorney, Agent, or Firm*—Volentine & Whitt, PLLC (57) ABSTRACT

An Orthogonal Frequency Division Multiplexing (OFDM) receiver of a wireless Local Area Network (LAN) system uses double cross-correlation and double peak-value comparison for symbol timing synchronization. The OFDM receiver of the wireless LAN system performs first differential cross-correlation using a short training symbol as a reference signal, performs second differential cross-correlation for an output value of the first differential cross-correlation, and performs double peak-value comparison for an output value of the second differential cross-correlation. In this way, fast symbol synchronization is achieved due to an excellent correlation property. Accordingly, a wireless LAN system including the OFDM receiver has a high response speed.

16 Claims, 6 Drawing Sheets

Sample index

FIG. 6

Sample Index

ORTHOGONAL FREQUENCY DIVISION MULTIPLEXING (OFDM) RECEIVER USED IN WIRELESS LOCAL AREA NETWORK SYSTEM AND SYMBOL TIMING SYNCHRONIZATION METHOD THEREFOR

CROSS REFERENCES TO RELATED APPLICATIONS

This application claims priority under 35 U.S.C. § 119 from Korean Patent Application No. 2003-16490, filed on Mar. 17, 2003, the contents of which are hereby incorporated by reference in their entirety as if fully set forth herein.

BACKGROUND AND SUMMARY

1. Technical Field

The present invention relates to wireless Local Area Networks (LANs), and more particularly, to an Orthogonal Frequency Division Multiplexing (OFDM) receiver used in a LAN and an OFDM method therefor.

2. Description

Wireless Local Area Network (LAN) systems wirelessly connect public LANs and private LANs, to provide convenience of information transmission to users of devices such as computers and mobile communication terminal. Orthogonal Frequency Division Multiplexing (OFDM) signals using high frequency bands are generally received/transmitted on multiplex carriers at a maximum transmission rate of 54 Mbps in a 5.4 GHz frequency band, as defined by the IEEE 802.11a standard. IEEE 802.11 defines various types of signals such as a Direct Sequence Spread Spectrum (DSSS) signal and a Complementary Code Keying (CCK) signal. An OFDM receiver that receives OFDM signals is described below.

Figure 1:
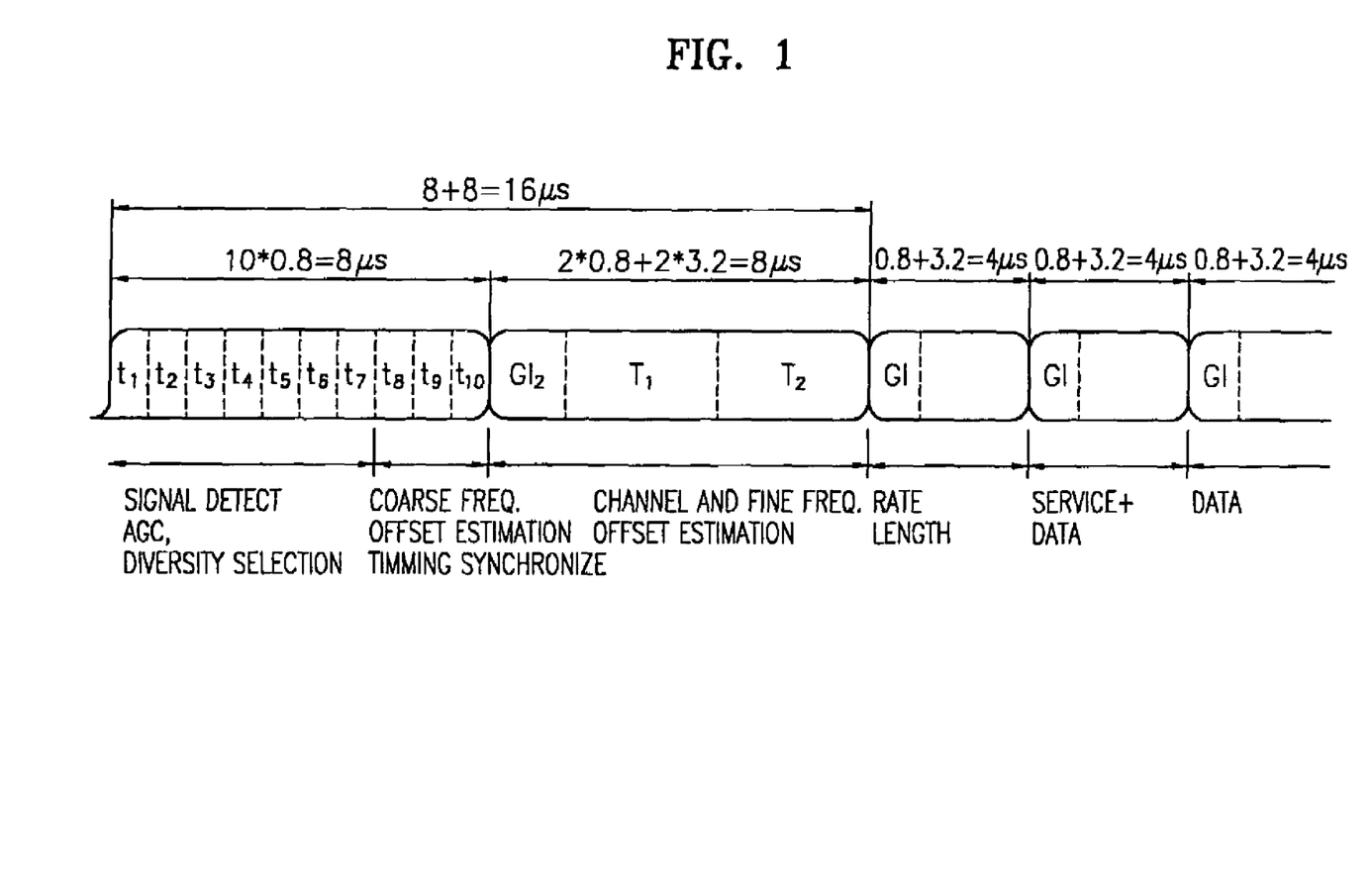
FIG. 1 is a diagram of a signal standard of a general OFDM signal, a preamble interval of which is shown in detail.

FIG. 1 is a diagram of a signal standard of a general OFDM signal, wherein a preamble area of the OFDM signal, which is defined in the IEEE 802.11a standard, is illustrated in detail. Referring to FIG. 1, the preamble area of the OFDM signal consists of a short training symbol interval having 10 repeated patterns within a time period of at least 8 μs, and a long training symbol interval having one Guide Interval (GI) and two repeated patterns within a subsequent time period of 8 μs. The short training symbol interval consists of 16 samples of a signal, and the long training symbol interval consists of 64 samples of a signal. Symbol timing synchronization means finding a boundary between the short training symbol interval and the long training symbol interval.

In a conventional symbol timing synchronization method, cross-correlation and peak value detection are performed using the short training symbol or the long training symbol as a reference signal, to generate symbol clocks. Since a better cross-correlation property can be obtained when cross-correlation is performed using the longer training symbol as the reference signal, cross-correlation is generally performed using the long training symbol as the reference signal. However, the long training symbol interval is received after the short training symbol, which reduces a response speed of a whole system. Details for signal receiving operations of an OFDM receiver are disclosed in Europe Patent No. EP 1,126,673.

The conventional symbol timing synchronization method which performs cross-correlation using the long training symbol as the reference signal can obtain a good cross-correlation property, since an OFDM signal is subjected to cross-correlation through a correlator during the long time period of the long training symbol interval. However, the conventional method cannot measure fine frequency offsets and channel coefficients before symbol synchronization is achieved. As a result, the conventional method described above reduces a response speed of the entire system. Also, if another technique is added to prevent response speed reduction, the entire system becomes complicated.

Meanwhile, a method in which cross-correlation is performed using the short training symbol as a reference signal can increase the response speed of the system. However, in such a method, since seven parts (t1-t7) within the short training symbol interval are used for performing operations such as Auto Gain Control (AGC), according to a property of IEEE 802.11a receivers, only three parts (t8-t10) are used as valid time periods by the correlator, which deteriorates the cross-correlation property. Also, because the number of signal samples of the short training symbol is small, the short training symbol has a poor correlation property due to effects of noise, frequency offsets, etc., compared to the long training symbol.

Accordingly, it would be desirable to provide an orthogonal frequency division multiplexing (OFDM) receiver used in a wireless LAN system, capable of improving a cross-correlation property and achieving fast symbol synchronization, by performing first cross-correlation for an OFDM signal using a differential value of a short training symbol as a reference signal, performing second cross-correlation for an output value of the first cross-correlation, on the basis of an auto correlation value of the differential value of the short training symbol, and performing double peak-value comparison for an output value of the second cross-correlation.

It would also be desirable to provide an OFDM receiving method used for a wireless LAN system, capable of improving a cross-correlation property and achieving fast symbol synchronization, by performing first cross-correlation for an OFDM signal using a differential value of a short training symbol as a reference signal, performing second cross-correlation for an output value of the first cross-correlation, on the basis of an auto correlation value of the differential value of the short training symbol, and performing double peak-value comparison for an output value of the second cross-correlation.

According to one aspect of the present invention, OFDM receiver comprises a radio frequency (RF) module unit, an analog-to-digital (A/D) converter, a first differential cross-correlation unit, a second differential cross-correlation unit, a first peak detector, a second peak detector, a symbol clock generator, and an inverse fast fourier transform (IFFT) unit.

The RF module receives a radio transmission, and extracts and outputs an OFDM analog signal from a signal existing on an allocated channel.

The A/D converter samples and converts the OFDM analog signal to an OFDM digital signal.

The first differential cross-correlation unit performs first cross-correlation for the OFDM digital signal and a differential value DVTS of a short training symbol according to an OFDM standard (an expected differential value of a short training symbol), and outputs a first differential cross-correlation value Z1.

The second differential cross-correlation unit performs second cross-correlation for the first differential cross-correlation value Z1 and an auto correlation value ACVTS of the differential value DVTS of the short training symbol, and outputs a second differential cross-correlation value Z.

The first peak detector compares a previous first peak value $Z(d_{max}*(i-1))$, which is a peak value among a previous M (e.g., 16) sample values of the second differential cross-correlation value Z, with a present first peak value Z($d_{max}$*(i)) which is a peak value among a following (subsequent) M (e.g., 16) sample values of the second differential cross-correlation value Z, in response to a second boundary detection signal P indicating that a second condition is satisfied, and outputs a first boundary detection signal P1 corresponding to a first condition.

The second peak detector compares a previous second peak value Z($d_{max+1}$*(i−1)), which is the next sample value after the peak value among the previous M (e.g., 16) sample values of the second differential cross-correlation value Z, with a present second peak value Z($d_{max+1}$*(i)), which is the next sample value after the peak value among the following (subsequent) M (e.g., 16) sample values of the second differential cross-correlation value Z, in response to the first boundary detection signal P1 indicating that the first condition is satisfied, and outputs the second boundary detection signal P corresponding to the second condition. The symbol clock generator determines the location $d_{max}$*(i−1) of the previous first peak value as a boundary between the short training interval and the long training interval, and generates a symbol clock SCLK synchronized to the location $d_{max}$*(i−1), when the first boundary detection signal P1 indicating that the first condition is not satisfied, or the second boundary detection signal P indicating that the second condition is not satisfied, is active.

The IFFT unit synchronizes the digital signal output from the A/D converter to the symbol clock SCLK, performs an IFFT for the synchronized signal, and outputs a digital symbol IFTS.

Beneficially, the cross-correlation performed to calculate the first differential cross-correlation value uses Equations (1) through (4) below:

$$P_k = b_k e^{j(2\pi \Delta f k T_s + \theta_0)} \quad (1)$$

$$b_k = \sum_{n=0}^{N-1} a_n e^{j\frac{2\pi nk}{N}}$$

wherein $P_k$ is a k-th signal sample representing the digital signal, $b_k$ is an ideal k-th signal sample, $T_s$ is a sample interval, $\Delta f$ is the frequency deviation of the received signal, $\theta_0$ is an initial phase value of the received signal, N is a point size of an IFFT, and $a_n$ is a data symbol from a transmission side transmitted on a n-th sub-channel;

$$R1(k) = b^*_{k-1} b_k \quad (2)$$

wherein $R1(k)$ is the differential value of the short training symbol;

$$T(d) = P_{k+d-1} P^*_{k+d} \quad (3)$$

wherein d is a location of a time area, that is, any sampled time location; and $$Z1(d) = \sum_{k=1}^{16} T(d)R1(k) \quad (4)$$
$$= \sum_{k=1}^{16} (P_{k+d-1} p^*_{k+d})(b^*_{k-1} b_k)$$
$$= \sum_{k=1}^{16} (b_{k+d-1} b^*_{k+d})(b^*_{k-1} b_k) e^{j(2\pi \Delta f T_s)}$$

wherein $Z1(d)$ is the first differential cross-correlation value.

Beneficially, the first condition is expressed mathematically as the following Equation:

$$\beta * Z(d_{max}*(i-1)) < Z(d_{max}*(i)),$$

wherein β is an arbitrary coefficient, Z($d_{max}$*(i−1)) is the previous first peak value, $d_{max}$*(i−1) is the location of the previous first peak value, Z($d_{max}$*(i)) is the present first peak value, and $d_{max}$*(i) is a location of the present first peak value.

Beneficially, β is less than 0.5.

Beneficially, the first boundary detection signal becomes non-active if the first condition is satisfied, and becomes active if the first condition is not satisfied.

Beneficially, the second condition is expressed mathematically as the following Equation:

$$\gamma * Z(d_{max+1}*(i-1)) < Z(d_{max+1}*(i)),$$

wherein γ is an arbitrary coefficient, Z($d_{max+1}$*(i−1)) is the previous second peak value, $d_{max+1}$*(i−1) is a location of the previous second peak value, Z($d_{max+1}$*(i)) is the present second peak value, and $d_{max+1}$*(i) is a location of the present second peak value.

Beneficially, γ is less than 0.35.

Beneficially, the second boundary detection signal becomes non-active if the second condition is satisfied, and becomes active if the second condition is not satisfied.

According to another aspect of the present invention, an OFDM receiving method of a wireless LAN system, comprises: receiving a sky wave, and extracting and outputting an OFDM analog signal from a signal existing on an allocated channel; sampling and converting the OFDM analog signal into a digital signal; performing first cross-correlation for the digital signal and a difference value of a short training symbol according to an OFDM standard, and outputting a first differential cross-correlation value; performing second cross-correlation of the first differential cross-correlation value and an auto correlation value of the difference value of the short training symbol, and outputting a second differential cross-correlation value; comparing a previous first peak value Z($d_{max}$*(i−1)), which is a peak value among a previous M (e.g., 16) sample values of the second differential cross-correlation value, with a present first peak value Z($d_{max}$*(i)) which is a peak value among a following (subsequent) M (e.g., 16) sample values of the second differential cross-correlation value, in response to a second boundary detection signal indicating that a second condition is satisfied, and outputting a first boundary detection signal corresponding to a first condition; comparing a previous second peak value Z($d_{max+1}$*(i−1)), which is a next sample value after the peak value among the previous M (e.g., 16) sample values of the second differential cross-correlation value, with a present second peak value Z(($d_{max+1}$*(i)) which is a next sample value after the peak value among the following (subsequent) M (e.g., 16) sample values of the second differential cross-correlation value, in response to the first boundary detection signal indicating that the first condition is satisfied, and outputting second boundary detection signal corresponding to the second condition; determining the location $d_{max}$*(i−1) of the previous first peak value as a boundary of a long training symbol interval and a short training symbol interval according to the OFDM standard, and generating a symbol clock synchronized to the location $d_{max}$*(i−1), when the first boundary detection signal indicating that the first condition is not satisfied, or the second boundary detection signal indicating that the second condition is not satisfied, is active; and synchronizing the digital signal to the symbol clock, performing IFFT for the synchronized signal, and outputting a digital symbol.

Beneficially, the first cross-correlation performed to calculate the first differential cross-correlation value uses Equations (1) through (4) below:

$$P_k = b_k e^{j(2\pi \Delta f k T_s + \theta_0)} \quad (1)$$

$$b_k = \sum_{n=0}^{N-1} a_n e^{j\frac{2\pi n k}{N}}$$

wherein $P_k$ is a k-th signal sample representing the digital signal, $b_k$ is an ideal k-th signal sample, $T_s$ is a sample interval, $\Delta f$ is the frequency deviation of the received signal, $\theta_0$ is an initial phase value of the received signal, N is a point size of an IFFT, and $a_n$ is a data symbol from a transmission side transmitted on a n-th sub-channel;

$$R1(k) = b^*_{k-1} b_k \quad (2)$$

wherein $R1(k)$ is the differential value of the short training symbol;

$$T(d) = P_{k+d-1} P^*_{k+d} \quad (3)$$

wherein d is a location of a time area, that is, any sampled time location; and $$Z1(d) = \sum_{k=1}^{16} T(d) R1(k) \quad (4)$$

$$= \sum_{k=1}^{16} (P_{k+d-1} P^*_{k+d})(b^*_{k-1} b_k)$$

$$= \sum_{k=1}^{16} (b_{k+d-1} b^*_{k+d})(b^*_{k-1} b_k) e^{j(2\pi \Delta f T_s)}$$

wherein $Z1(d)$ is the first differential cross-correlation value.

Beneficially, the first condition is expressed mathematically as the following Equation:

$$\beta * Z(d_{max}*(i-1)) < Z(d_{max}*(i)),$$

wherein β is an arbitrary coefficient, $Z(d_{max}*(i-1))$ is the previous first peak value, $d_{max}*(i-1)$ is the location of the previous first peak value, $Z(d_{max}*(i))$ is the present first peak value, and $d_{max}*(i)$ is a location of the present first peak value.

Beneficially, β is less than 0.5.

Beneficially, the first boundary detection signal becomes non-active if the first condition is satisfied, and becomes active if the first condition is not satisfied.

Beneficially, the second condition is expressed mathematically as the following Equation:

$$\gamma * Z(d_{max+1}*(i-1)) < Z(d_{max+1}*(i)),$$

wherein γ is an arbitrary coefficient, $Z(d_{max+1}*(i-1))$ is the previous second peak value, $d_{max+1}*(i-1)$ is a location of the previous second peak value, $Z(d_{max+1}*(i))$ is the present second peak value, and $d_{max+1}*(i)$ is a location of the present second peak value.

Beneficially, γ is less than 0.35.

Preferably, the second boundary detection signal becomes non-active if the second condition is satisfied, and becomes active if the second condition is not satisfied.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, embodiments of the present invention will be described in detail with reference to the appended drawings. Throughout the drawings, like elements are denoted by like reference numerals.

Figure 2:
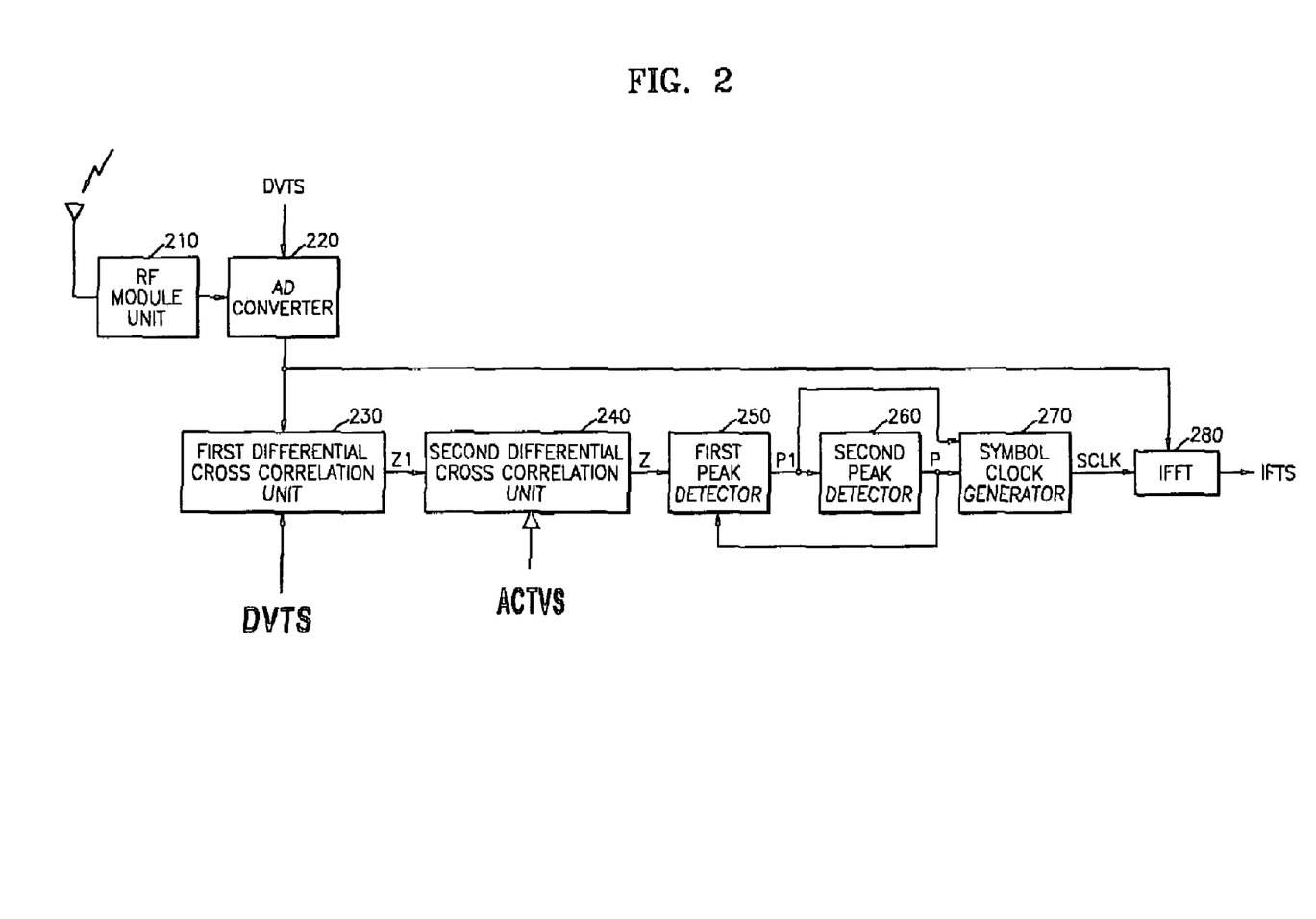
FIG. 2 is a block diagram of one embodiment of an OFDM receiver used in a wireless LAN system.

FIG. 2 is a block diagram of one embodiment of an OFDM receiver used in a wireless LAN system.

Referring to FIG. 2, the OFDM receiver comprises a radio frequency (RF) module unit 210, an analog-to-digital (A/D) converter 220, a first differential cross-correlation unit 230, a second differential cross-correlation unit 240, a first peak detector 250, a second peak detector 260, a symbol clock generator 270, and an Inverse Fast Fourier Transform (IFFT) unit 280.

The RF module unit 210 receives a radio transmission and extracts and outputs an OFDM analog signal from a signal existing on an allocated channel. Generally, the OFDM signal is received or transmitted at a maximum transmission rate of 54 Mbps on multiple sub-channels in a 5.4 GHz frequency band, as defined in the IEEE 802.11a standard. However, operation at other data rates and/or in other frequency bands is possible.

The A/D converter 220 samples and converts the OFDM analog signal into a digital signal and outputs the digital signal. The first differential cross-correlation unit 230 performs first cross-correlation for the digital signal and a differential value DVTS of the short training symbol according to the OFDM standard, and outputs a first differential cross-correlation value Z1. The second differential cross-correlation unit 240 performs second cross-correlation for the first differential cross-correlation value Z1 and an auto cross-correlation value ACVTS of the differential value DVTS of the short training symbol, and outputs a second differential cross-correlation value Z.

Here, cross-correlation is performed to calculate the first differential cross-correlation value Z1 using Equations 1 through 4 below. Similarly, when the second differential cross-correlation value Z is calculated, the digital signal and the DVTS are replaced by the Z1 and the ACVTS, respectively, and Z1 is replaced by Z. A cross-correlation method for obtaining a strong cross-correlation property regardless of frequency offsets of a received signal is disclosed in detail in "A Novel Symbol Frame and Carrier Frequency Synchronization for Burst Mode OFDM Signal", Proceeding of VTC 2000 Fall, by H. Kobayashi.

$$P_k = b_k e^{j(2\pi \Delta f k T_s + \theta_0)} \quad (1)$$

$$b_k = \sum_{n=0}^{N-1} a_n e^{j\frac{2\pi n k}{N}}$$

Here, $P_k$ is a k-th sampled digital-signal, $b_k$ is an ideal k-th signal sample, $T_s$ is a sample interval, $\Delta f$ is the frequency deviation of the received signal, $\theta_0$ is an initial phase value of the received signal, N is a point size of an IFFT, and $a_n$ is a data symbol from a transmission side transmitted on an n-th sub-channel;

$$R1(k) = b^*_{k-1} b_k \quad (2)$$

Here, $R1(k)$ is the differential value of the short training symbol.

$$T(d) = P_{k+d-1} P^*_{k+d} \quad (3)$$

Here, d is a location of a time area, or any sampled time location.

$$Z1(d) = \sum_{k=1}^{16} T(d) R1(k) \quad (4)$$

$$= \sum_{k=1}^{16} (P_{k+d-1} P^*_{k+d})(b^*_{k-1} b_k)$$

$$= \sum_{k=1}^{16} (b_{k+d-1} b^*_{k+d})(b^*_{k-1} b_k) e^{j(2\pi \Delta f T_s)}$$

Here, $Z1(d)$ is the first differential cross-correlation value.

The first peak detector 250 compares a previous first peak value $Z(d_{max}*(i-1))$, which is a peak value among the previous M (e.g., 16) sample values of the second differential cross-correlation value Z, with a present first peak value $Z(d_{max}*(i))$ which is a peak value among the following (subsequent) M (e.g., 16) sample values of the second differential cross-correlation value Z, in response to a second boundary detection signal P indicating that a second condition is satisfied, and outputs a first boundary detection signal P1 corresponding to a first condition. The second peak detector 260 compares a previous second peak value $Z(d_{max+1}*(i-1))$, which is the next sample value after the peak value among the previous M (e.g., 16) sample values of the second differential cross-correlation value Z, with a present second peak value $Z(d_{max+1}*(i))$ which is the next sample value after the peak value among the following (subsequent) M (e.g., 16) sample values of the second differential cross-correlation value Z, in response to the first boundary detection signal P1 indicating that the first condition is satisfied, and outputs the second boundary detection signal P corresponding to the second condition.

The first condition corresponds to Equation 5 below, wherein β is less than 0.5. The first boundary detection signal P1 becomes in a non-active state, that is, a first logic state (logic low state), when the first condition is satisfied, and changes into an active logic state, that is, a second logic state (logic high state), when the first condition is not satisfied.

$$\beta * Z(d_{max}*(i-1)) < Z(d_{max}*(i)) \quad (5)$$

Here, β is an arbitrary coefficient (less than 0.5), $Z(d_{max}*(i-1))$ is the previous first peak value, $d_{max}*(i-1)$ is the location of the previous first peak value, $Z(d_{max}*(i))$ is the present first peak value, and $d_{max}*(i)$ is the location of the present first peak value.

The second condition corresponds to Equation 6 below, wherein γ is less than 0.35. The second boundary detection signal P becomes in a non-active state, that is, a first logic state (logic low state), when the second condition is satisfied, and changes into a second logic state (logic high state), when the second condition is not satisfied.

$$\gamma * Z(d_{max+1}*(i-1)) < Z(d_{max+1}*(i)) \quad (6)$$

Here, γ is an arbitrary coefficient (less than 0.35), $Z(d_{max+1}*(i-1))$ is the previous second peak value, $d_{max+1}*(i-1)$ is the location of the previous second peak value, $Z(d_{max+1}*(i))$ is the present second peak value, and $d_{max+1}*(i)$ is the location of the present second peak value.

The symbol clock generator 270 determines the location $d_{max}*(i-1)$ of the previous first peak value as a boundary between the short training symbol interval and the long training symbol interval according to the OFDM standard, when the first boundary detection signal P1 indicating that the first condition is not satisfied, and/or the second boundary detection signal P indicating that the second condition is not satisfied, is active, and generates a symbol clock SCLK synchronized to the location $d_{max}*(i-1)$. The IFFT unit 280 synchronizes the digital signal to the symbol clock SCLK, performs an IFFT for the synchronized digital signal, and outputs a digital symbol IFTS.

Hereinafter, operations of an embodiment of an OFDM receiver used in the wireless LAN system will be described in more detail.

Figure 3:
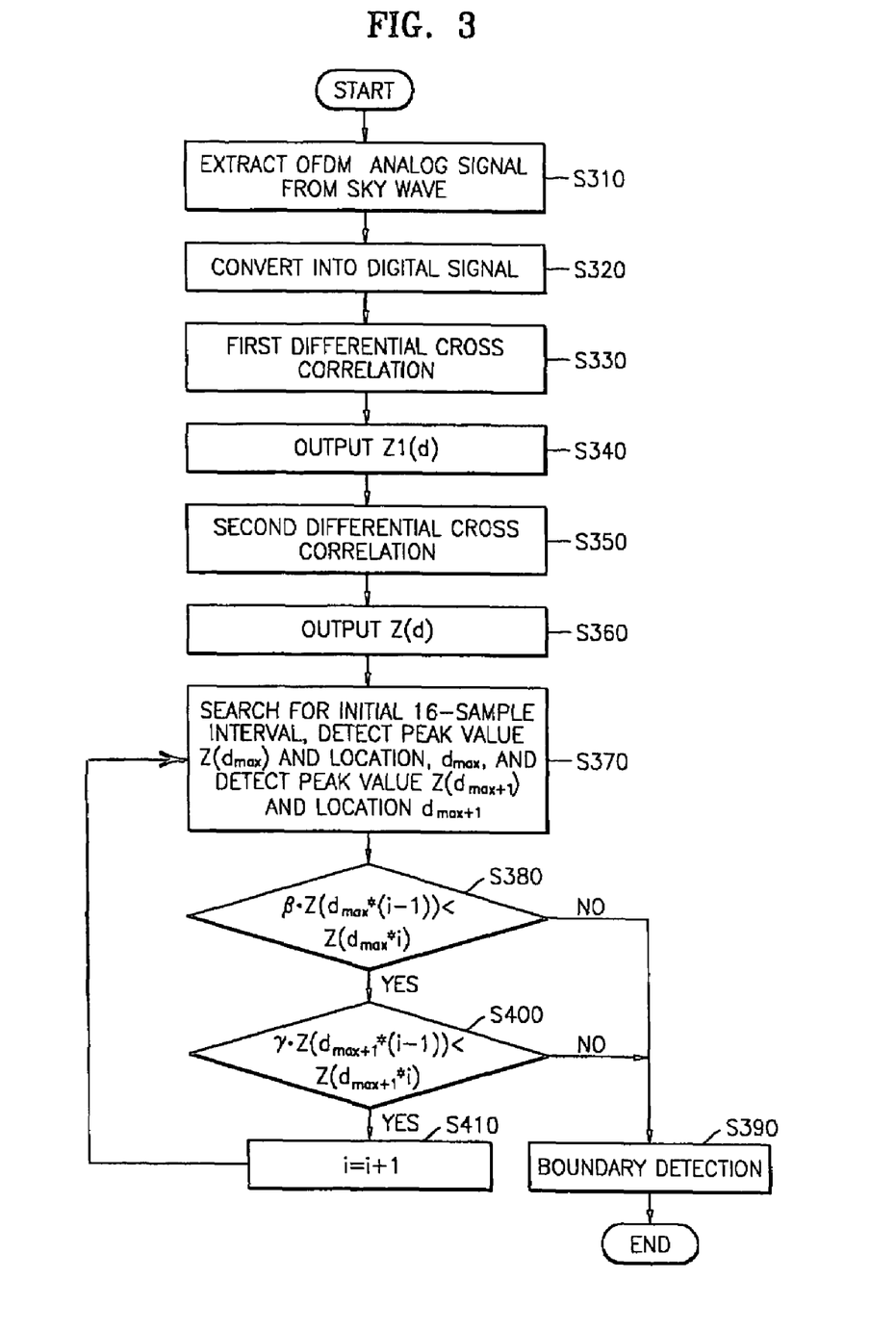
FIG. 3 is a flow chart for describing operations of the OFDM receiver shown in FIG. 2.

FIG. 3 is a flow chart for describing the operations of an OFDM receiver used in the wireless LAN system.

Referring to FIG. 3, in the OFDM receiver according to FIG. 2, the RF module unit 210 receives a sky wave and extracts and outputs an OFDM analog signal from a signal existing on an allocated channel (step S310). Then, the A/D converter 220 samples and converts the OFDM analog signal into a digital signal (step S320). The first differential cross-correlation unit 230 performs first cross-correlation for the digital signal and a differential value DVTS of the short training symbol according to the OFDM standard, using Equations 1 through 4, and outputs a first differential cross-correlation value Z1(d) (steps S330 and S340). The second differential cross-correlation unit 240 performs second cross-correlation for the first differential cross-correlation value Z1 and an auto correlation value ACVTS of the differential value DVTS of the short training symbol, and outputs a second differential cross-correlation value Z(d) (steps S350 and S360). That is, the second differential cross-correlation value Z(d) is obtained by performing cross-correlation a second time for the first differential cross-correlation value Z1 and the auto correlation value ACVTS of the differential value DVTS of the short training symbol, using Equations 1 through 4.

Figure 4:
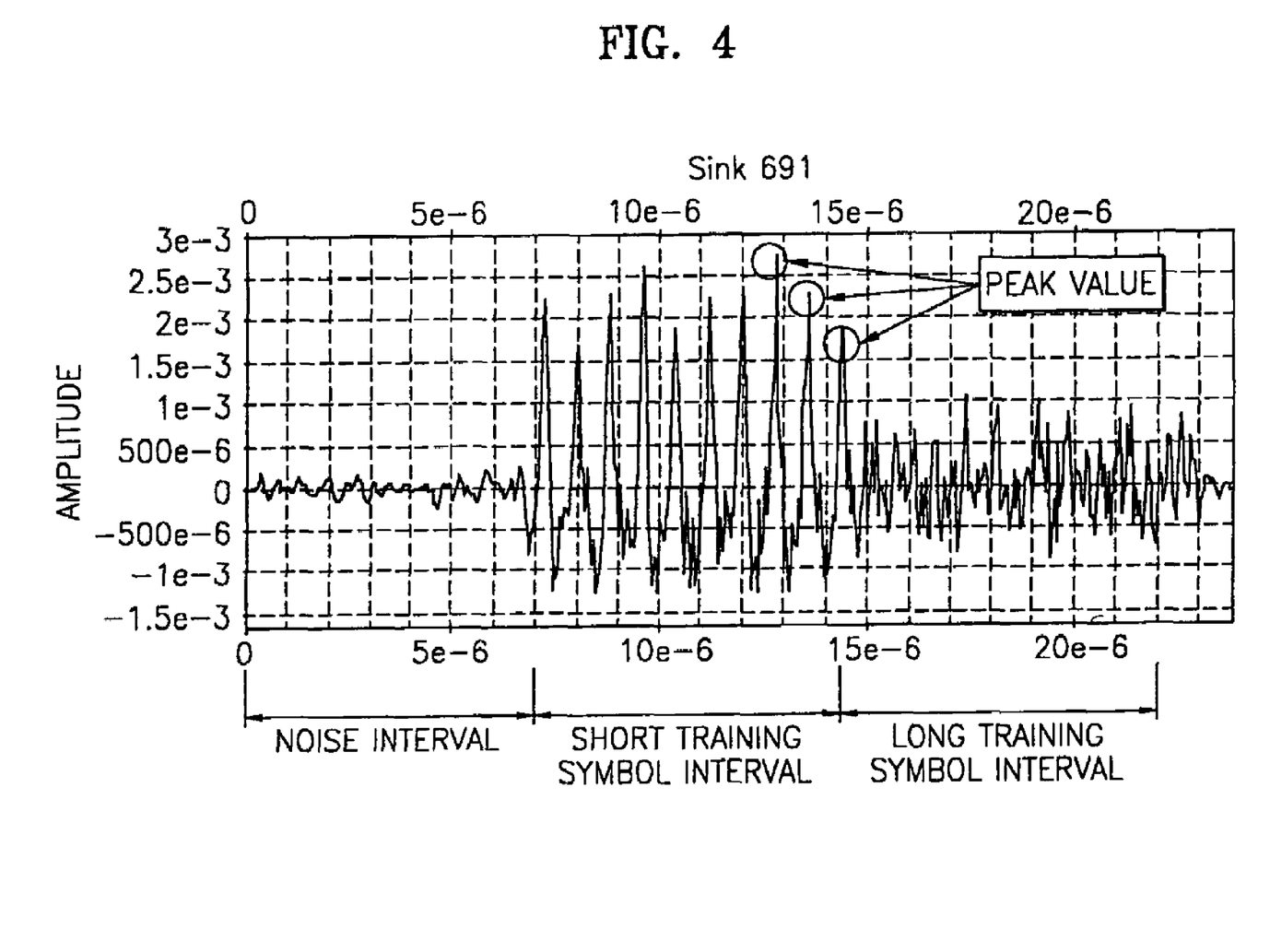
FIG. 4 is a graph of simulation results showing an output waveform of a first cross-correlation unit shown in FIG. 2.

FIG. 4 is a graph of a simulated output waveform of the first cross-correlation unit shown in FIG. 2. Referring to FIG. 4, the output waveform of the first cross-correlation unit has 10 peak values within the short training interval t1-t10. The waveform of FIG. 4 is the result of a simulation of the case where signal to noise ratio (SNR) is 5 dB and a normalized frequency offset is 1.235, when a quadrature phase shift keying (QPSK) modulation method is used under a multipath fading channel environment. However, since the interval t1-t7 is practically an area for performing AGC, etc., the only valid peak values used by the first differential cross-correlation unit 230 are the last three peak values before the short training symbol interval ends, as shown in FIG. 4. As seen in FIG. 4, in the case where the frequency offset is a normalized frequency offset value of 1.235, a strong robust-receiver property can be obtained.

When the signal-to-noise ratio (SNR) is low, or under a multipath fading channel environment, much distortion exists in the peak values. In this case, it is very difficult to find the exact locations of the peak values using a conventional symbol synchronization method. As a result, symbol synchronization performance is degraded. To solve this problem, the OFDM receiver of FIG. 2 sets the auto correlation value ACVTS of the differential value DVTS of the short training symbol as a reference signal value of the second differential cross-correlation unit 240, and performs a second cross-correlation.

Figure 5:
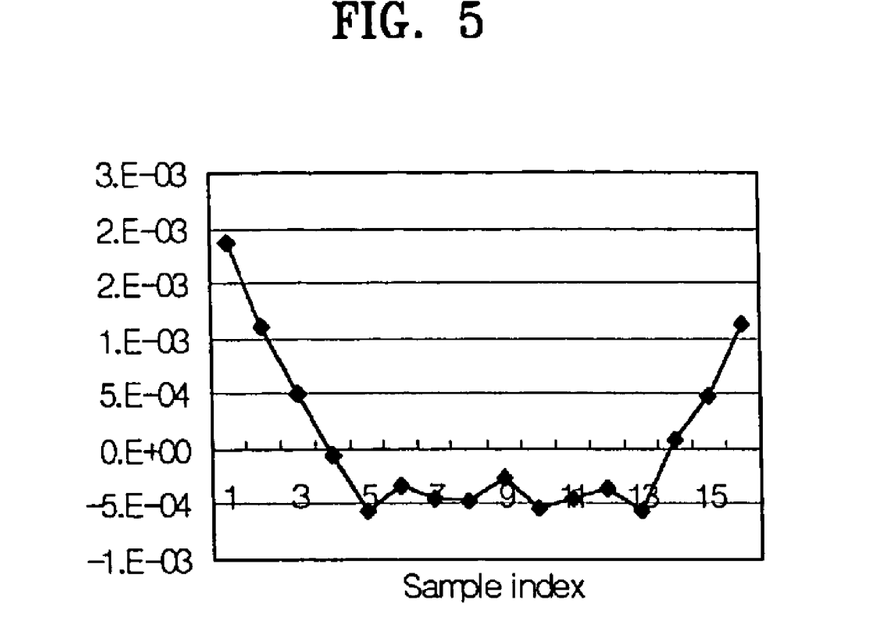
FIG. 5 is a plot illustrating a waveform for a differential value of a short training symbol.

FIG. 5 is a plot illustrating a waveform for the differential value DVTS of the short training symbol.

Here, the waveform is for a short training symbol according to an OFDM standard defined in the IEEE 802.11a.

Figure 6:
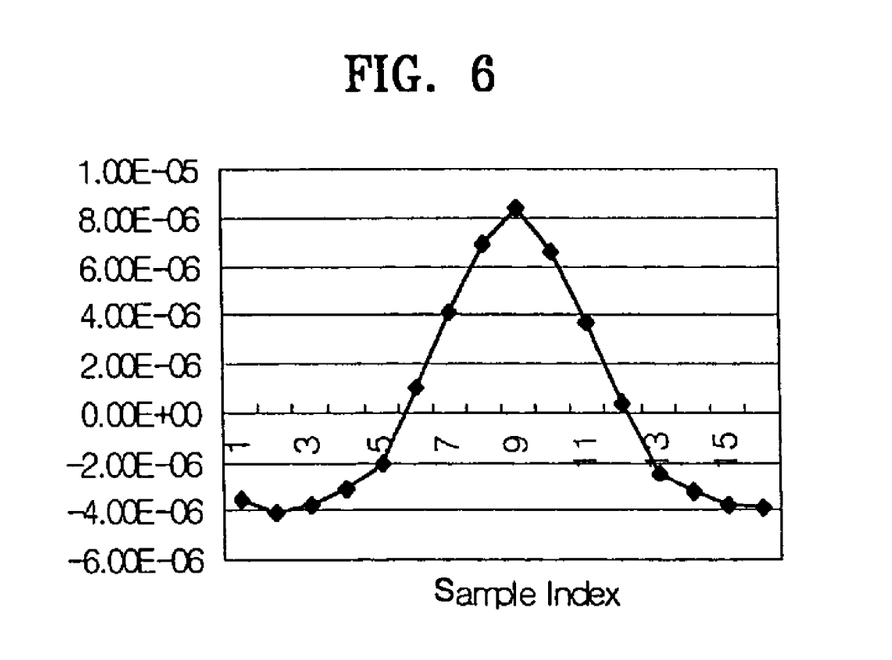
FIG. 6 is a plot illustrating an auto correlation value for the waveform of FIG. 5.

FIG. 6 is a plot illustrating the auto correlation value ACVTS for the waveform of FIG. 5.

The auto correlation value ACVTS for the waveform of FIG. 5 is used as data for determining a property of a correlation relationship. As shown in FIG. 6, since values on the immediate left and right of a peak value are about 80% of the peak value, and following two values to the left and right are about 50% of the peak value, a correlation property is not good. That is, there is a high probability for the OFDM receiver to determine one of the locations on the left or the right of the true peak value as the location of the peak value, due to noise. To solve this problem, the OFDM receiver of FIG. 2 includes the first peak detector 250 and the second peak detector 260, for performing two peak-value comparisons.

The first peak detector 250 searches for a first peak value $Z(d_{max}*(i-1))$, which is a peak value among the previous M (e.g., 16) sample values of the second differential cross-correlation value Z, a location $d_{max}*(i-1)$ of the first peak value. The second peak detector 260 searches for a second peak value $Z(d_{max+1}*(i-1))$, which is the next sample value after the peak value, and a location $d_{max+1}*(i-1)$ of the second peak value (step S370).

Accordingly, (step S380) the first peak detector 250 compares a previous first peak value $Z(d_{max}*(i-1))$, which is a peak value among the previous M (e.g., 16) sample values of the second differential cross-correlation value Z, with a present first peak value $Z(d_{max}*(i))$, which is a peak value among the following (subsequent) M (e.g., 16) sample values of the second differential cross-correlation value Z, in response to the second boundary detection signal P indicating that the second condition is satisfied, and outputs the first boundary detection signal P1 corresponding to a first condition represented by Equation 5. If the first boundary detection signal P1 indicates that the first condition is not satisfied, then the boundary between the short training symbol interval and the long training symbol interval has been detected (step S390). If the first boundary detection signal P1 indicates that the first condition is satisfied, then the operation proceeds to the second peak detector 260.

The second peak detector 260 (step S400) compares a previous second peak value $Z(d_{max+1}*(i-1))$, which is the next sample value after the peak value among the previous M (e.g., 16) sample values of the second differential cross-correlation value Z, with a present second peak value $Z(d_{max+1}*(i))$, which is the next sample value after the peak value among the following (subsequent) M (e.g., 16) sample values, in response to the first boundary detection signal P1 indicating that the first condition represented by Equation 5 is satisfied, and outputs the second boundary detection signal P corresponding to the second condition (step S390). If the second boundary detection signal P indicates that the second condition is not satisfied, then the boundary between the short training symbol interval and the long training symbol interval has been detected (step S390). If the second boundary detection signal P indicates that the second condition is satisfied, then the index i is incremented (step S410) and operation returns to step S370 where the next M (e.g., 16) samples are searched for a peak, and the process continues.

In Equation 5, $\beta$ is beneficially set to 0.5. The first boundary detection signal P1 becomes in a non-active state, that is, a first logic state (logic low state) in the case of satisfying the first condition, and is changed into an active state, that is, a second logic state (logic high state) in the case of not satisfying the first condition.

In Equation 6, $\gamma$ is beneficially set to 0.3-0.35. The second boundary detection signal becomes in a non-active state, that is, a first logic state (logic low state), when the second condition is satisfied, and changes into an active state, that is, a second logic state (logic high state), when the second condition is not satisfied.

Accordingly, the symbol clock generator 270 determines the location $d_{max}*(i-1)$ of the previous first peak value as a boundary between the long training symbol interval and the short training symbol interval according to the OFDM standard, when the first boundary detection signal P1 indicating that the first condition is not satisfied, and/or the second boundary detection signal P indicating that the second condition is not satisfied, is active, and generates a symbol clock SCLK synchronized to the location $d_{max}*(i-1)$. The IFFT unit 280 synchronizes the digital signal to the symbol clock SCLK, performs IFFT for the synchronized digital signal, and output a digital symbol IFTS.

If symbol synchronization is performed using the above-described method, cross-correlation performance can be improved. The reason is described below with reference to three cases: a first case where the value immediately preceding (on the left of) an ideal peak value is selected as a peak value of the first M (e.g., 16) sample values, due to noise, etc.; a second case where the ideal peak value is selected as the peak value; and a third case where the value immediately following (on the right of) the ideal peak value is selected as the peak value.

In the first case, if the following (subsequent) M (e.g., 16) sample values exist within the short training interval, the selected peak value still amounts to about 80% of the ideal peak value. Therefore, there is a high probability that the first condition of Equation 5 is satisfied. Also, since the next sample value is the ideal peak value, there is a high probability that the second condition of Equation 6 is satisfied. Also, in the first case, if the following (subsequent) M (e.g., 16) sample values exist within the long symbol training interval, there is no correlation relationship. Therefore, in this case, there is a low probability that the first condition of Equation 5 is satisfied. Here, even if the first condition of Equation 5 is satisfied due to the effects of noise, etc., there is a very low probability that the second condition of Equation 6 is satisfied.

In the second case, if the following (subsequent) M (e.g., 16) sample values exist within the short training symbol interval, there is a high probability that the first condition of Equation 5 is satisfied, as in the first case. Then, since the next sample values after the selected peak value have relatively large correlation values (about 80% of the ideal peak value) according to comparison of the second peak values, there is a high probability that the second condition is satisfied. In the second case, if the following (subsequent) M (e.g., 16) sample values exist within the long training symbol interval, the situation is the same as in the first case.

In the third case, if the following (subsequent) M (e.g., 16) sample values exist within the short training symbol interval, the selected peak value has a relatively large correlation value (about 80% of the ideal peak value) according to comparison of the first peak values. Therefore, there is a high probability that the first condition of Equation 5 is satisfied. The correlation values of the next sample values after the selected peak value are about 50% of the ideal peak value according to comparison of the second peak values. Although this value is lower than in the first case or the second case, there is a relatively high probability that the second condition of Equation 6 is satisfied because $\gamma$ is set to 30%. In the third case, if the following (subsequent) M (e.g., 16) sample values exist within the long training symbol interval, the situation is the same as in the first case.

As described above, a peak value is maintained as a stochastic base of correlation values, by performing two peak-value comparisons, even when a location of an ideal peak value is not found in an initial M (e.g., 16)-sample interval. Therefore, the probability of finding a boundary between the short training symbol interval and the long training interval is improved excellently.

Figure 7:
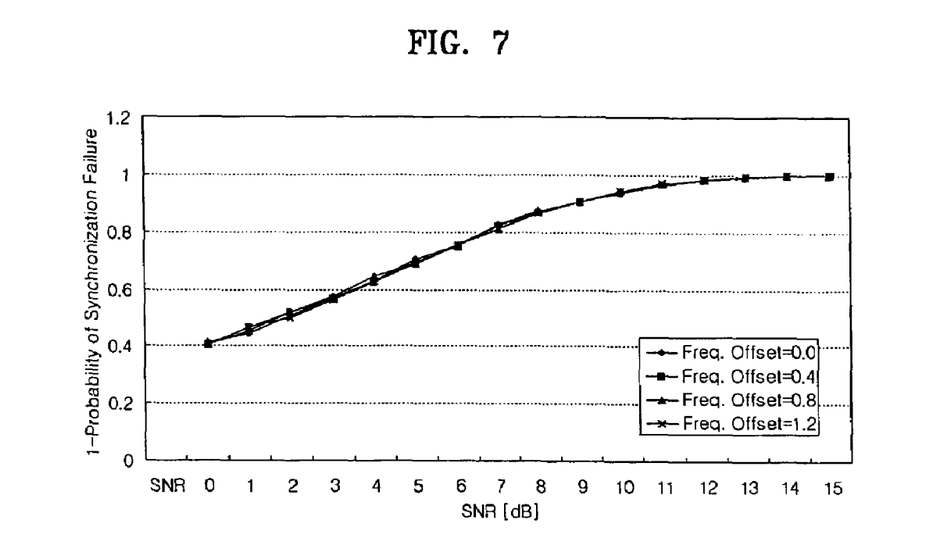
FIG. 7 is a plot illustrating synchronization probability in the case where a long training symbol is used as a reference value of the cross-correlation unit in a conventional OFDM receiver.

FIG. 7 is a plot illustrating synchronization probability in the case where a long training symbol is used as a reference value of the cross-correlation unit in a conventional OFDM receiver.

Figure 8:
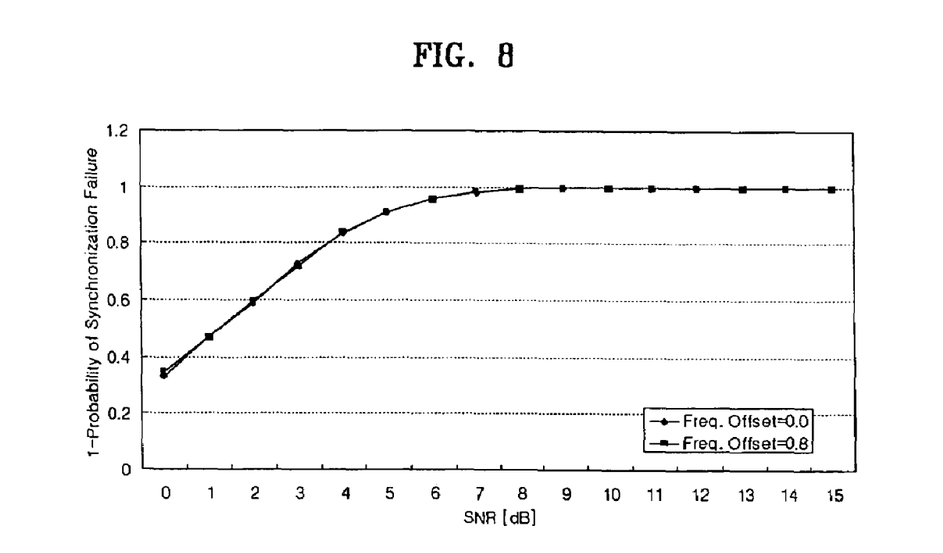
FIG. 8 is a plot illustrating synchronization probability of the OFDM receiver shown in FIG. 2.

FIG. 8 is a graph illustrating synchronization probability of the OFDM receiver shown in FIG. 2.

Referring to FIGS. 7 and 8, symbol synchronization estimation performances of the conventional OFDM receiver and the OFDM receiver of FIG. 2 are illustrated. In FIG. 8, it is seen that the OFDM receiver of FIG. 2 performs better in view of frequency offsets and exhibits better performance even when SNR is low, compared to the conventional OFDM receiver.

As described above, in the OFDM receiver of FIG. 2 used in a wireless LAN system, the first differential cross-correlation unit 230 performs first cross-correlation for the digital signal and the differential value DVTS of the short training symbol according to the OFDM standard, and outputs the first differential cross-correlation value Z1. The second differential cross-correlation unit 240 performs second cross-correlation for the first differential cross-correlation value Z1 and the auto correlation value ACVTS of the differential value DVTS of the short differential training symbol, and outputs a second differential cross-correlation value Z. The first peak detector 250 compares the first peak values $Z(d_{max}*(i-1))$ and $Z(d_{max}*(i))$ and outputs the first boundary detection signal P1 corresponding to the first condition. The second peak detector 260 compares the second peak values $d_{max+1}*(i-1))$ and $Z(d_{max+1}*(i))$ and outputs the second boundary detection signal P corresponding to the second condition. Then, the symbol clock generator 270 determines the first peak value location $d_{max}*(i-1)$ as a boundary between the long training interval and the short training symbol interval according to the OFDM standard, when the first boundary detection signal P1 and/or the second boundary detection signal P is active, and generates a symbol clock SCLK synchronized to the location $d_{max}*(i-1)$.

Therefore, the OFDM receiver of FIG. 2 used in the wireless LAN system can perform symbol synchronization at a high speed based on an excellent correlation property, by performing first cross-correlation using the differential value of the short training symbol as a reference signal, performing second cross-correlation for the output value subjected to first cross-correlation, and performing two peak-value comparisons for the output value subjected to second cross-correlation. Accordingly, the OFDM receiver of FIG. 2 can increase the response speed of a wireless LAN system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An orthogonal frequency division multiplexing (OFDM) receiver of a wireless Local Area Network (LAN) system, comprising:

a radio frequency (RF) module, adapted to receive a radio signal, and to extract therefrom and output an OFDM analog signal;

an analog-to-digital (A/D) converter, adapted to sample and convert the OFDM analog signal into an OFDM digital signal;

a first differential cross-correlation unit, adapted to perform a first cross-correlation of the OFDM digital signal and an expected differential value of a short training symbol, and to output a first differential cross-correlation value;

a second differential cross-correlation unit, adapted to perform a second cross-correlation of the first differential cross-correlation value and an auto correlation value of the expected differential value of the short training symbol, and to output a second differential cross-correlation value;

a first peak value detection unit, adapted to compare a previous first peak value $Z(d_{max}*(i-1))$, which is a peak value among a previous M sample values of the second differential cross-correlation value, with a present first peak value $Z(d_{max}*(i))$, which is a peak value among a following M sample values of the second differential cross-correlation value, in response to a second boundary detection signal indicating that a second condition is satisfied, and to output a first boundary detection signal corresponding to a first condition;

a second peak value detection unit, adapted to compare a previous second peak value $Z(d_{max+1}*(i-1))$, which is a next sample value after the previous first peak value among the previous M sample values of the second differential cross-correlation value, with a present second peak value $Z(d_{max+1}*(i))$, which is a next sample value after the present first peak value among the following M sample values of the second differential cross-correlation value, in response to the first boundary detection signal indicating that the first condition is satisfied, and to output the second boundary detection signal corresponding to the second condition;

a symbol clock generator, adapted to determine a location $d_{max}*(i-1)$ of the previous first peak value as a boundary between a long training symbol interval and a short training symbol interval, and to generate a symbol clock synchronized to the location $d_{max}*(i-1)$, when at least one of the first boundary value detection signal indicating that the first condition is not satisfied, and the second boundary value detection signal indicating that the second condition is not satisfied, is active; and an inverse fast Fourier transform (IFFT) unit, adapted to synchronize the OFDM digital signal to the symbol clock, to perform an IFFT for the synchronized digital signal, and to output a digital symbol.

2. The OFDM receiver of claim 1, wherein the cross-correlation is performed to calculate the differential cross-correlation value using equations below:

$$P_k = b_k e^{j(2\pi \Delta f k T_s + \theta_0)}$$

$$b_k = \sum_{n=0}^{N-1} a_n e^{j\frac{2\pi n k}{N}}$$

wherein $P_k$ is a k-th signal sample representing the digital signal, $b_k$ is an ideal k-th signal sample, $T_s$ is a sample interval, $\eta_0$ is an initial phase value, N is a point size of IFFT, and $a_n$ is a data symbol from a transmission side transmitted on a n-th sub-channel;

$$R1(k) = b^*_{k-1} b_k$$

wherein R1(k) is the differential value of the short training symbol;

$$T(d) = P_{k+d-1} P^*_{k+d}$$

wherein d is a location of a time area; and $$Z1(d) = \sum_{k=1}^{16} T(d) R1(k)$$
$$= \sum_{k=1}^{16} (P_{k+d-1} p^*_{k+d})(b^*_{k-1} b_k)$$
$$= \sum_{k=1}^{16} (b_{k+d-1} b^*_{k+d})(b^*_{k-1} b_k) e^{j(2\pi \Delta f T_s)}$$

wherein Z1(d) is the differential cross-correlation value.

3. The OFDM receiver of claim 1, wherein the first condition is expressed mathematically as the following equation:

$$\beta * Z(d_{max}*(i-1)) < Z(d_{max}*(i)),$$

wherein β is an arbitrary coefficient, $Z(d_{max}*(i-1))$ is the previous first peak value, $d_{max}*(i-1)$ is the location of the previous first peak value, $Z(d_{max}*(i))$ is the present first peak value, and $d_{max}*(i)$ is a location of the present first peak value.

4. The OFDM receiver of claim 3, wherein β is less than 0.5.

5. The OFDM receiver of claim 1, wherein the first boundary detection signal becomes non-active if the first condition is satisfied, and becomes active if the first condition is not satisfied.

6. The OFDM receiver of claim 1, wherein the second condition is expressed mathematically as the following equation:

$$\gamma * Z(d_{max+1}*(i-1)) < Z(d_{max+1}*(i)),$$

wherein γ is an arbitrary coefficient, $Z(d_{max+1}*(i-1))$ is the previous second peak value, $d_{max+1}*(i-1)$ is a location of the previous second peak value, $Z(d_{max+1}*(i))$ is the present second peak value, and $d_{max+1}*(i)$ is a location of the present second peak value.

7. The OFDM receiver of claim 6, wherein γ is less than 0.35.

8. The OFDM receiver of claim 1, wherein the second boundary detection signal becomes non-active if the second condition is satisfied, and becomes active if the second condition is not satisfied.

9. An orthogonal frequency division multiplexing (OFDM) receiving method of a wireless LAN system, comprising:

receiving a radio signal, and extracting therefrom and outputting an OFDM analog;

sampling and converting the OFDM analog signal into a digital signal;

performing a first cross-correlation of the digital signal and a difference value of a short training symbol according to an OFDM standard, and outputting a first differential cross-correlation value;

performing a second cross-correlation of the first differential cross-correlation value and an auto correlation value of the difference value of the short training symbol, and outputting a second differential cross-correlation value;

comparing a previous first peak value $Z(d_{max}*(i-1))$, which is a peak value among a previous M sample values of the second differential cross-correlation value, with a present first peak value $Z(d_{max}*(i))$ which is a peak value among a following M sample values of the second differential cross-correlation value, in response to a second boundary detection signal indicating that a second condition is satisfied, and outputting a first boundary detection signal corresponding to a first condition;

comparing a previous second peak value $Z(d_{max+1}*(i-1))$, which is a next sample value after the peak value among the previous M sample values of the second differential cross-correlation value, with a present second peak value $Z((d_{max+1}*(i))$ which is a next sample value after the peak value among the following M sample values of the second differential cross-correlation value, in response to the first boundary detection signal indicating that the first condition is satisfied, and outputting the second boundary detection signal corresponding to the second condition;

determining the location $d_{max}*(i-1)$ of the previous first peak value as a boundary of a long training symbol interval and a short training symbol interval according to the OFDM standard, and generating a symbol clock synchronized to the location $d_{max}*(i-1)$, when at least one of the first boundary detection signal indicating that the first condition is not satisfied, and the second boundary detection signal indicating that the second condition is not satisfied, is active; and synchronizing the digital signal to the symbol clock, performing IFFT for the synchronized digital signal, and outputting a digital symbol.

10. The OFDM receiving method of claim 9, wherein the cross-correlation is performed to calculate the differential cross-correlation value using equations below:

$$P_k = b_k e^{j(2\pi \Delta f k T_s + \theta_0)}$$

$$b_k = \sum_{n=0}^{N-1} a_n e^{j\frac{2\pi nk}{N}}$$

wherein $P_k$ is a k-th sampled digital signal representing the digital signal, $b_k$ is an ideal k-th signal sample, $T_s$ is a sample interval, $\eta_0$ is an initial phase value, N is a point size of IFFT, and $a_n$ is a data symbol from a transmission side transmitted on a n-th sub-channel;

$$R1(k) = b_{k-1} b_k$$

wherein R1(k) is the differential value of the short training symbol;

$$T(d) = P_{k+d-1} P^*_{k+d}$$

wherein d is a location of a time area; and $$Z1(d) = \sum_{k=1}^{16} T(d)R1(k)$$
$$= \sum_{k=1}^{16} (P_{k+d-1} p^*_{k+d})(b^*_{k-1} b_k)$$
$$= \sum_{k=1}^{16} (b_{k+d-1} b^*_{k+d})(b^*_{k-1} b_k) e^{j(2\pi \Delta f T_s)}$$

wherein Z1(d) is the differential cross-correlation value.

11. The OFDM receiving method of claim 9, wherein the first condition is expressed mathematically as the following Equation:

$$\beta * Z(d_{max}*(i-1)) < Z(d_{max}*(i)),$$

wherein $\beta$ is an arbitrary coefficient, $Z(d_{max}*(i-1))$ is the previous first peak value, $d_{max}*(i-1)$ is the location of the previous first peak value, $Z(d_{max}*(i))$ is the present first peak value, and $d_{max}*(i)$ is a location of the present first peak value.

12. The OFDM receiving method of claim 11, wherein $\beta$ is below 0.5.

13. The OFDM receiving method of claim 9, wherein the first boundary detection signal becomes non-active if the first condition is satisfied, and becomes active if the first condition is not satisfied.

14. The OFDM receiving method of claim 9, wherein the second condition is expressed mathematically as the following Equation:

$$\gamma * Z(d_{max+1}*(i-1)) < Z(d_{max+1}*(i)),$$

wherein $\gamma$ is an arbitrary coefficient, $Z(d_{max}*(i-1))$ is the previous second peak value, $d_{max+1}*(i-1)$ is a location of the previous second peak value, $Z(d_{max+1}*(i))$ is the present second peak value, and $d_{max+1}*(i)$ is a location of the present second peak value.

15. The OFDM receiving method of claim 14, wherein $\gamma$ is less than 0.35.

16. The OFDM receiving method of claim 9, wherein the second boundary detection signal becomes non-active if the second condition is satisfied and becomes active if the second condition is not satisfied.

* * * * *